United States Patent
Petrov (10) Patent No.: US 9,648,438 B1
(45) Date of Patent: May 9, 2017

(54) HEAD-RELATED TRANSFER FUNCTION RECORDING USING POSITIONAL TRACKING

(71) Applicant: Oculus VR, LLC, Menlo Park, CA (US)

(72) Inventor: Yury Anatolievich Petrov, Coto de Caza, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 14/971,787

(22) Filed: Dec. 16, 2015

(51) Int. Cl.
| H04R 5/00 | (2006.01) |
| H04R 29/00 | (2006.01) |
| H04S 7/00 | (2006.01) |
| H04R 5/04 | (2006.01) |
| G02B 27/01 | (2006.01) |

(52) U.S. Cl.
CPC .......... *H04S 7/303* (2013.01); *G02B 27/0172* (2013.01); *H04R 5/04* (2013.01); *H04S 2400/11* (2013.01); *H04S 2420/01* (2013.01)

(58) Field of Classification Search
CPC .......... H04S 2420/01; H04S 7/00; H04S 7/30; H04S 7/301; H04S 7/302; H04S 7/303; H04S 7/305; H04S 7/308; H04S 7/40; H04S 2400/11; H04S 2400/15; H04R 5/04; H04R 1/323; H04R 1/326; H04R 29/00; H04R 29/001
See application file for complete search history.

(56) References Cited

U.S. PATENT DOCUMENTS

| 5,173,944 A | * | 12/1992 | Begault | ...................... | H04S 5/00 381/17 |
| 5,729,612 A | * | 3/1998 | Abel | ..................... | H04R 29/001 381/1 |
| 6,768,798 B1 | * | 7/2004 | Dempsey | .................. | H04S 7/00 381/1 |
| 2004/0091119 A1 | * | 5/2004 | Duraiswami | ........... | H04S 1/002 381/26 |
| 2004/0196991 A1 | * | 10/2004 | Iida | ......................... | H04S 1/005 381/309 |
| 2011/0224812 A1 | * | 9/2011 | Kotulla | ................. | H04R 29/001 700/94 |
| 2014/0355765 A1 | * | 12/2014 | Kulavik | .................. | H04S 7/302 381/17 |
| 2016/0119731 A1 | * | 4/2016 | Lester, III | ............ | H04R 29/001 381/59 |

* cited by examiner

*Primary Examiner* — Thang Tran
(74) *Attorney, Agent, or Firm* — Fenwick & West LLP (57) ABSTRACT

A system calibrates one or more head-related transfer functions (HRTFs) for a user. An indicator is presented on a head-mounted display, where the indicator prompts the user to turn the user's head to view the indicator and effectively change the user's head orientation. The head orientation corresponds to positions of both ears, thus a position of the indicator prompting to change the user's head orientation is associated with corresponding positions of both ears. Responsive to the indicator being viewed by the user, a sound source at a fixed position transmits a test sound and the test sound is received at microphones coupled to the user's ears. By analyzing the test sound received at the microphones, a unique HRTF associated with a relative position between the sound source and each ear can be obtained.

20 Claims, 5 Drawing Sheets

HEAD-RELATED TRANSFER FUNCTION RECORDING USING POSITIONAL TRACKING

BACKGROUND

The present disclosure generally relates to stereophony and specifically to acquiring a head-related transfer function (HRTF) for a user.

A sound perceived at two ears can be different, depending on a direction and a location of a sound source with respect to each ear as well as on the surroundings of a room in which the sound is perceived. Humans can determine a location of the sound source by comparing the sound perceived at each ear. In a "surround sound" system a plurality of speakers reproduce the directional aspects of sound using HRTFs. A HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears.

Conventionally, HRTFs are determined (e.g., via a speaker array) in a sound dampening chamber for many different source locations (e.g., typically more than a 100) relative to a person. The determined HRTFs may then be used to generate a "surround sound" experience for the person. But the quality of the surround sound depends heavily on the number of different locations used to generate the HRTFs. Moreover, to reduce error, it is common to determine multiple HRTFs for each speaker location (i.e., each speaker is generating a plurality of discrete sounds). Accordingly, for high quality surround sound it takes a relatively long time (e.g., more than an hour) to determine the HRTFs as there are multiple HRTFs determined for many different speaker locations. Additionally, the infrastructure for measuring HRTFs sufficient for quality surround sound is rather complex (e.g., sound dampening chamber, one or more speaker arrays, etc.). Accordingly, conventional approaches for obtaining HRTFs are inefficient in terms of hardware resources and/or time needed.

SUMMARY

Embodiments relate to a system and a method for obtaining a HRTF for a user. In one embodiment, a user wears a head-mounted display for viewing a virtual reality or an augmented reality. An indicator is presented in VR space on the head-mounted display, the indicator prompting the user to turn the user's head to view the indicator. For viewing the indicator, the user turns/tilts his head in a certain orientation. The orientation of the head corresponds to a position of each ear relative to a reference point. Accordingly, a position of the indicator is likewise associated with corresponding positions of both ears relative to a reference point. Responsive to the indicator being aligned with the head orientation, a sound source at a fixed position transmits a test sound, and the test sound is received at microphones coupled to the user's ears. By analyzing the test sound received at the microphones, a unique HRTF associated with a relative position between the sound source and each ear can be obtained. The indicator is presented at different coordinates or positions on the head-mounted display to obtain a plurality of HRTFs for various positions.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

An entertainment system operates in two modes: a calibration mode and a presentation mode. In the calibration mode, a HRTF calibration is performed. The HRTF characterizes how an ear (e.g., ear canal) of a user receives a sound from a sound source at a particular position relative to the ear. In the presentation mode, audio content is presented to the user according to the HRTF calibration performed.

In the calibration mode, a console performs a HRTF calibration using a speaker, a head-mounted display (herein also referred to as "a headset"), and a microphone for each ear. In the calibration mode, a user wears the headset displaying images and the microphones capturing sounds on both ears. The headset displays an image or an indicator that prompts a user to view a particular coordinate in the virtual reality space. The user is expected to turn his/her head in a specific head orientation to view the image or the indicator. The console confirms whether a head orientation of the user is aligned with the indicator to determine positions of ears with respect to the speaker. The console confirms the head orientation through the headset, or through an imaging device (e.g., a camera or a motion sensor). Responsive to confirming the indicator at the particular coordinate is aligned with the head orientation, the console configures the speaker at a fixed position to generate a test sound. The microphones receive the test sound, and the console analyzes the test sound received at the microphones to obtain HRTFs.

Based on the HRTFs obtained, the console determines an audio characterization configuration. The audio characterization configuration is a function, which the console uses in conjunction with the headset to synthesize a binaural sound that seems to come from a particular point in space. Accordingly, an audio characterization configuration specific to the user allows the console to provide surround sound to the user. In one embodiment, the HRTFs and the audio characterization configuration are stored once the HRTF calibration is completed, hence the HRTF calibration is generally a onetime calibration. However, a user may perform the HRTF calibration at any time.

In the presentation mode, the console presents content through the speaker and/or the headset, according to the HRTF calibration performed. In one embodiment, images of the content are presented to the user through the headset. In addition, surround sounds are provided to the user through one or more speakers, according to the audio characterization configuration. In one embodiment, the console tracks the user movement (e.g., head orientation) through the headset and presents the content according to the user movement. In another embodiment, the console tracks the user movement (e.g., head orientation) through the imaging device and presents the content according to the user movement.

In one embodiment, the entertainment system is implemented as a virtual reality (VR) system for presenting a virtual reality experience to a user. In another embodiment, the entertainment system is implemented as an augmented reality system for presenting augmented reality experience to a user.

System Overview

Figure 1:
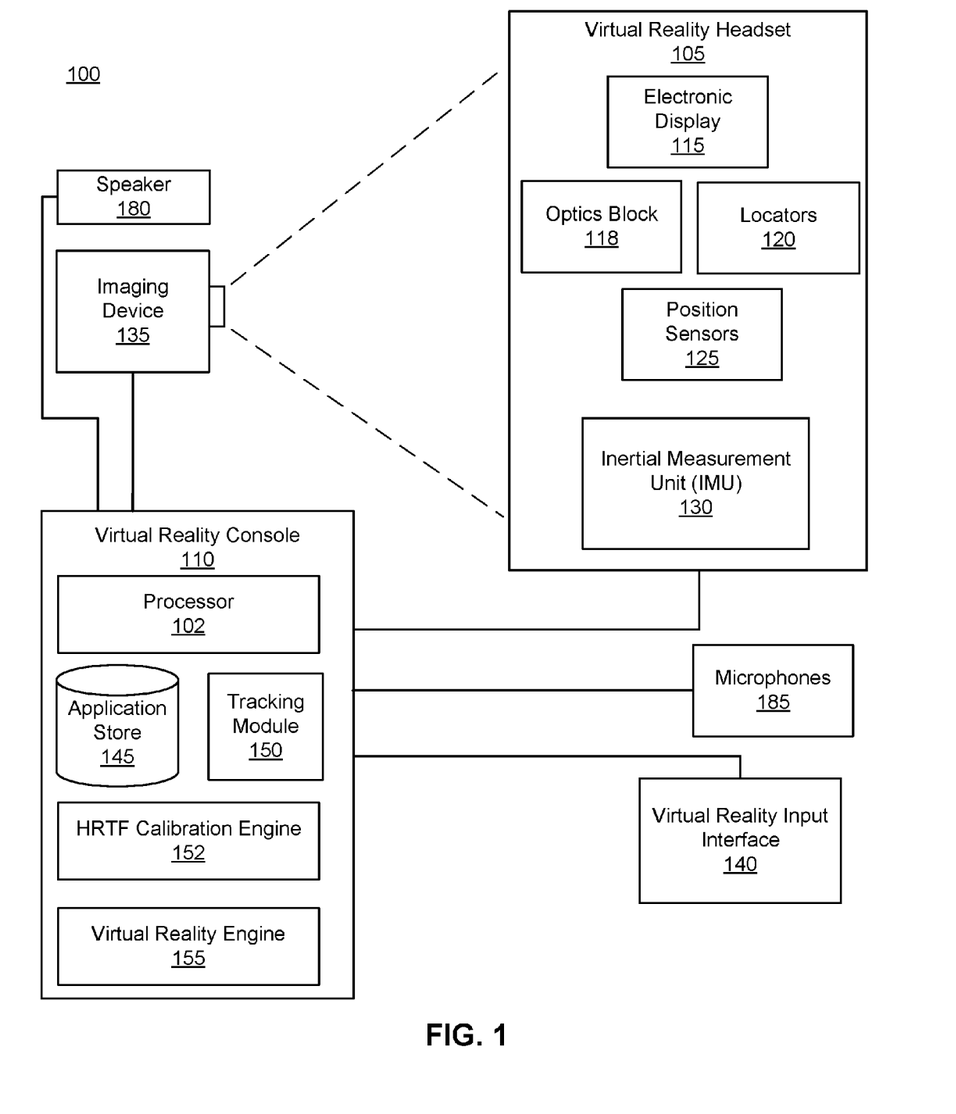
FIG. 1 is a block diagram of a system environment including a virtual reality system, in accordance with an embodiment.

FIG. 1 is a block diagram of a VR system environment 100 in which a VR console 110 operates. The system environment 100 shown by FIG. 1 comprises a VR headset 105, an imaging device 135, a VR input interface 140, a speaker 180, and a pair of microphones 185 that are each coupled to the VR console 110. While FIG. 1 shows an example system environment 100 including one VR headset 105, one imaging device 135, one VR input interface 140, one speaker 180, and a pair of microphones 185, in other embodiments any number of these components may be included in the VR system environment 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100. Similarly, the functions can be distributed among the components in a different manner than is described here. For example, some or all of the functionality of the VR console 110 may be contained within the VR headset 105.

Turning now to an in depth discussion on the components of the system 100, the VR headset 105 is a head-mounted display that presents media to a user. Examples of media presented by the VR headset 105 include one or more images, video, audio, or any combination thereof. The VR headset 105 includes an electronic display 115, an optics block 118, one or more locators 120, one or more position sensors 125, and an inertial measurement unit (IMU) 130. The electronic display 115 displays images to the user in accordance with data received from the VR console 110.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide sounds to the user in accordance with instructions received from the VR console 110. For example, sounds are provided when an action request is received, or the VR console 110 communicates instructions to the VR input interface 140 causing the VR input interface 140 to generate sounds when the VR console 110 performs an action.

The speaker 180 is a device configured to transmit sound to the user. The speaker 180 is operated according to commands from the VR console 110. In one aspect, the speaker 180 is fixed at one position and transmits test sounds that the microphones 185 can receive for calibrating HRTFs. The test sounds transmitted by the speaker 180 for calibration include, for example, a continuous sinusoidal wave at a constant frequency, or a chirp. A chirp is a signal whose frequency is swept upward or downward for a period of time. In another aspect, the speaker 180 provides sounds that a user can optimally hear based on audio characterization configuration, in accordance with the image presented on the VR headset 105.

The microphone 185 is one or more devices configured to receive sound transmitted by the speaker 180, and to convert the received sound into an electronic format (analog or digital). In aspect, the microphone 185 receives a test sound transmitted from the speaker 180, and converts the received test sound into an audio sample. An audio sample herein refers to an electronic representation (either in an analog or digital format) of the received test sound. The microphone 185 provides audio samples to the VR console. In one embodiment, two microphones 185 are provided, where each microphone 185 is coupled to a respective ear. Preferably, a microphone 185 can be attached next to an ear canal, such that a unique HRTF can be obtained to represent how sounds arrive at the ear canal. In one aspect, the two microphones 185 are coupled to the VR Headset 105. Alternatively, the two microphones 185 are separated from the VR Headset 105.

The VR console 110 provides media to the VR headset 105 for presentation to the user in accordance with information received from one or more of: the imaging device 135, the VR headset 105, the VR input interface 140, and the microphone 185. The VR console 110 instructs the speaker 180 to transmit sounds either for performing HRTF calibrations in the calibration mode or for providing audible feedback as part of presenting virtual reality in the presentation mode. The VR console 110 may receive sounds detected at the microphones 185 to perform HRTF calibration. In the example shown in FIG. 1, the VR console 110 includes an application store 145, a tracking module 150, an HRTF calibration engine 152 and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor 102, generates content for presentation to the user. Content generated by an application may be in response to inputs received from the user via movement of the VR headset 105 or the VR input interface 140. Examples of applications include: gaming applications, conferencing applications, video playback application, or other suitable applications.

The tracking module 150 calibrates the VR system environment 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 150 re-calibrates some or all of the system environment 100. In one embodiment, the tracking module 150 is implemented in hardware, software, firmware, or a combination thereof.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The HRTF calibration engine 152 performs calibration of HRTFs in the calibration mode. In one aspect, the HRTF calibration engine 152 operates the speaker 180 and the VR headset 105 to perform HRTF calibration. In one approach, the HRTF calibration engine 152 prompts a user to turn his/her head at a specific direction through the VR headset. Responsive to determining that the orientation of the user's head is at the correct direction, the HRTF calibration engine 152 instructs the speaker 180 to transmit a test sound to the user. The HRTF calibration engine 152 prompts a user to turn his/her head at different directions. In some embodiments, the HRTF calibration engine 152 generates test sounds at different frequencies to obtain various audio samples. The HRTF calibration engine 152 obtains audio samples converted by the microphones 185 based on the transmitted test sound, and obtains HRTFs based on the audio samples. Moreover, the HRTF calibration engine 152 obtains, based on the plurality of HRTFs, an audio characterization configuration that can be used by the VR engine 155 for generating sounds (e.g., stereo sounds or surround sounds) when executing one or more applications in the application store 145. In one embodiment, the HRTF calibration engine 152 is implemented in hardware, software, firmware, or a combination thereof.

The HRTF calibration engine 152 generates an indicator at a coordinate of a virtual space. In one embodiment, the HRTF calibration engine 152 confirms whether the indicator is aligned with the head orientation of a user. For example, when a crosshair displayed on a center of the VR headset 105 is aligned with the indicator, the HRTF calibration engine 152 determines the indicator is aligned with the head orientation. For another example, when the indicator displayed on the VR headset 105 is located on a predetermined region (e.g., an oval or a rectangle) of the VR headset 105, the HRTF calibration engine 152 determines the indicator is aligned with the head orientation. The HRTF calibration engine 152 can also confirm whether the indicator is aligned with the head orientation through the tracking module 150 (e.g., by use of information obtained from the imaging device 135, the position sensors 125, or both) as described above. Responsive to the head orientation being aligned with the indicator at a coordinate of the VR space, the HRTF calibration engine 152 can determine the positions of ears and relative positions between the speaker 180 and both ears.

By presenting indicators at different coordinates and confirming the head orientations corresponding to different coordinates, test sounds from different sound sources at different locations with respect to a user can be simulated with the speaker 180 at a fixed position. For example, if a speaker is located at 30 degrees in a clockwise direction from a user in a normal position, causing the user head to turn 50 degrees to the counter clockwise direction from the normal position and generating a sound from the speaker at the same location can achieve a similar effect as producing a sound from a speaker located at 80 degrees in the clock wise direction from the user in the normal position. In one implementation, the HRTF calibration engine 152 populates a data set with coordinates in the virtual space that have a specific separation in angle with other coordinates in the data set. Specifically, the HRTF calibration engine 152 divides the VR space 220 into 42 different coordinates in 31.7 degree steps to obtain 42 or more audio samples for each ear, and performs interpolation to obtain additional HRTFs.

The HRTF calibration engine 152 instructs the speaker 180 to produce test sounds and analyzes test sound received at the microphones 185 to obtain HRTFs and an audio characterization configuration. Multiple test sounds with varying frequencies, amplitudes or sequence can be produced by the speaker 180. The HRTF calibration engine 152 retrieves audio samples of the test sounds received at the microphones 185. The HRTF calibration engine 152 obtains HRTFs based on the audio samples, then determines an audio characterization configuration based on the obtained HRTFs.

The audio characterization configuration is a function which the VR console 110 uses in conjunction with the VR headset 105 to synthesize a binaural sound that seems to come from a particular point in space. The VR console 110 may, e.g., fit an interpolating function to the HRTFs (e.g., a set of spherical harmonics), such that any given direction in space maps to an HRTF. Alternatively, the VR console 110 may generate a lookup table that maps different directions in space to the closest HRTFs. The audio characterization configuration can be used by the VR engine 155 for presenting sound (e.g., surround sound), when executing one or more applications in the application store 145 in the presentation mode.

In one embodiment, the HRTF calibration engine 152 obtains audio characterization configuration based on raw HRTFs using loudspeaker transfer function (LTF) and a headphone transfer function (HTF). Specifically, once the raw set of HRTFs is recorded, the speaker 180 used for recording and speakers (e.g., headphones embedded in the VR headset 105) used for playback characteristics are taken into account by multiplying the raw HRTFs by the LTF, and by dividing the multiplied HRTFs by the HTF, both are known in advance and are the same for all users. The set of corrected HRTFs is used to simulate a 3D sound via corresponding functions incorporated into standard audio libraries, e.g., OpenAL. To simulate a sound coming from a given direction this sound can be filtered (or convoluted) with audio characterization configuration. In one embodiment, the audio characterization configuration can be implemented as a head-related impulse response (HRIR) filter. The filter can be obtained by performing interpolation on a corrected set of HRTFs based on LTF and HTF according to the azimuth $\phi$ and elevation $\theta$ angles of a sound source to derive new HRTF corresponding to the location of the sound source, and by performing Fourier transformation on the new HRTF to obtain the HRIR filter.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. In one example, the VR engine 155 instructs the VR headset 105 to provide visual or audible feedback to the user. In one example, the VR engine 155 causes one or more speakers that may (or may not) include the speaker 180 to provide audible feedback (e.g., stereo sound or surround sound) to the user based on the audio characterization configuration.

In one embodiment, the VR engine 155 is implemented in hardware, software, firmware, or a combination thereof.

Example HRTF Calibration System

Figure 2A:
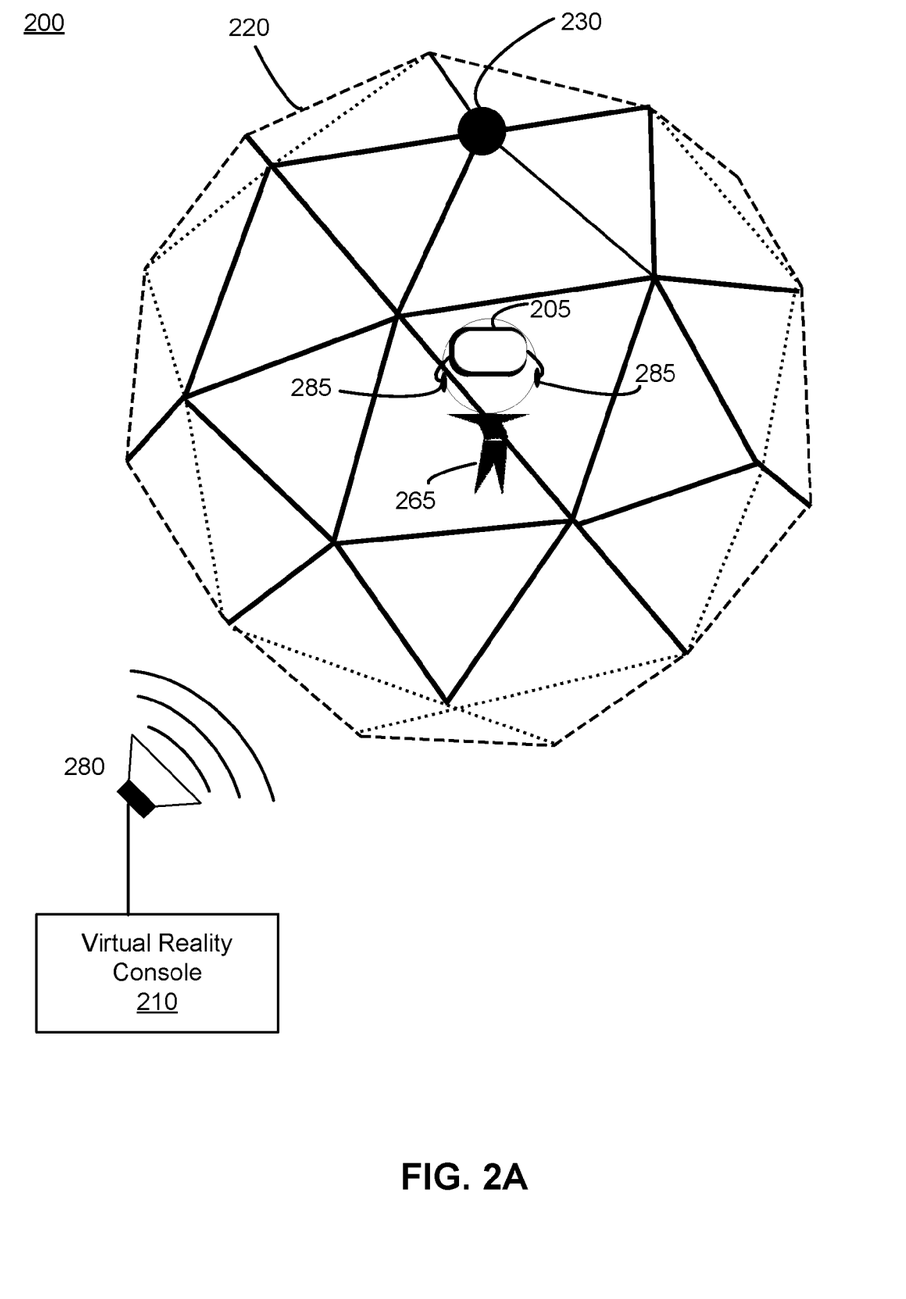
FIG. 2A is a diagram of an example system environment for obtaining an audio sample associated with one coordinate of a virtual reality space, in accordance with an embodiment.

FIG. 2A is an example diagram of a HRTF calibration system environment 200 for obtaining an audio sample associated with a coordinate of a virtual space, in accordance with an embodiment. In some embodiments, the HRTF calibration system environment 200 may be, e.g., the VR system environment 100. The HRTF calibration system environment 200 includes a console 210 that may be, e.g., the VR console 110 for obtaining HRTF calibration. A user 265 wears a head-mounted display (HMD) 205, which may be, e.g., the VR headset 105, for viewing a virtual reality image presented according to the console 210. In one example, the image presented by the HMD 205 for performing HRTF calibration includes an indicator 230 in a virtual space 220. In one example, the user 265 is prompted to view the indicator 230. After confirming that the indicator 230 is aligned with the head orientation, for example based on the location of the indicator 230 displayed on the HMD 205 with respect to a crosshair, the console 210 configures a speaker 280 (e.g., speaker 180) to generate a test sound. The console 210 receives the test sound at microphones 285 (e.g., the microphones 185 of FIG. 1). For each ear a corresponding microphone 285 converts the received test sound into an audio sample. The console 210 receives the audio samples from the microphones 285 and determines a corresponding HRTF for each ear.

In the example shown in FIG. 2A, the indicator 230 is presented above the user 265 in the virtual space 220, and the user 265 raises his head to view the indicator 230. The indicator 230 can be light, or a marking presented on the display of the HMD 205. The console 210 tracks the position of the VR headset 105 through an imaging device (e.g., the imaging device 135) and/or an IMU (both of which are not shown in FIG. 2) to confirm whether the indicator 230 is aligned with the head orientation. For example, the console 210 determines that the indicator 230 is aligned with the head orientation for at least a predetermined amount of time (e.g., 2 seconds), responsive to the indicator 230 being displayed on a center or a predetermined region of the display of the HMD 205 for the predetermined amount of time. In one embodiment, responsive to determining that the indicator is misaligned with the head orientation for the predetermined amount of time, the console 210 may prompt the user 265 to move their head until the indicator 230 is presented on a particular portion of the electronic display (e.g., center of the electronic display). Responsive to the console 210 confirming that the indicator is aligned with the head orientation for a predetermined amount of time (e.g., 2 seconds), the speaker 280 generates a test sound. A test sound is a sound produced by the speaker 280 for performing HRTF calibration. An example test sound includes, a single tone at a selected frequency, or a chirp including multiple tones. In one aspect, the frequency or a range of frequency for the test sound is determined based on the frequency encompassed in the audible feedback of the VR content.

Figure 2B:
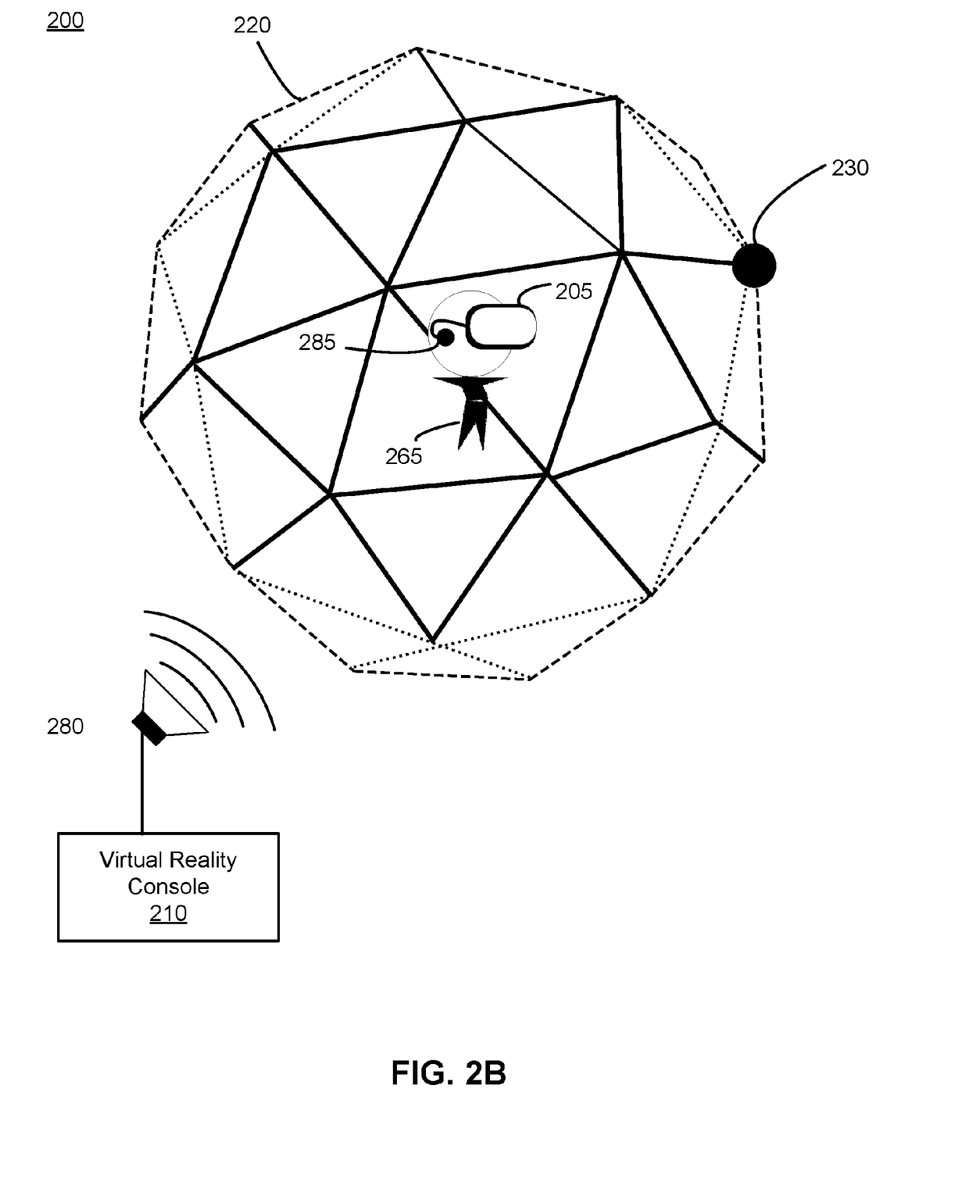
FIG. 2B is a diagram of the example system environment of FIG. 2A for obtaining an audio sample associated with another coordinate of the virtual reality space, in accordance with an embodiment.

FIG. 2B is an example diagram of the HRTF calibration system environment 200 of FIG. 2A for obtaining another audio sample associated with another coordinate of the virtual space 220, in accordance with an embodiment. The HRTF calibration system environment 200 of FIG. 2B is substantially similar to the HRTF calibration system environment 200 of FIG. 2A, except the indicator 230 is shifted to another coordinate of the virtual space 220, for example, to a left side of the user 265. Because the indicator 230 is displayed at a different coordinate, the user 265 turns his head to view the indicator 230 and the head orientation is changed. Thus, a relative position of each ear to the speaker 280 is changed. Accordingly, the console 210 can obtain different audio samples without employing multiple speakers at different locations or changing the position of the speaker 280. By utilizing the speaker 280 at the fixed location and prompting the user to change his/her head orientation, the HRTF calibration of multiple samples (e.g., 42 or more) can be performed within a few minutes (e.g., 5 minutes) instead of over a few hours using conventional approaches.

Figure 2C:
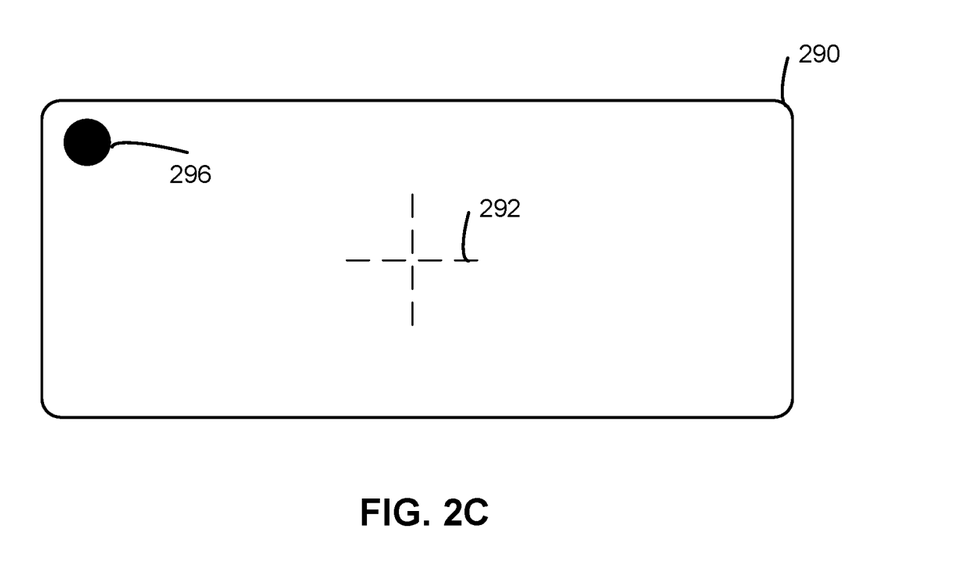
FIG. 2C is a diagram of a display in which an alignment prompt and an indicator are displayed by a head-mounted display and a user's head is not at a correct orientation, in accordance with an embodiment.

FIG. 2C is a diagram of a display in which an alignment prompt 292 and an indicator 296 are displayed by a head-mounted display (HMD) 205 and a user's head is not at a correct orientation, in accordance with an embodiment. As shown in FIG. 2C, a display 290 presents an alignment prompt 292 on a center of the display 290 or at one or more predetermined pixels of the display 290. In this embodiment, the alignment prompt 292 is a crosshair. But more generally, the alignment prompt 292 is any text and/or graphical interface that shows the user whether the user's head is at the correct orientation relative to a displayed indicator 296. In one aspect, the alignment prompt 292 reflects a current head orientation, where indicator reflects a target head orientation. The correct orientation occurs when the indicator 296 is at the center of the alignment prompt 292. In this example, during the calibration mode, the indicator 296 is positioned on a top left corner of the display 290, rather than on the alignment prompt 292. Accordingly, the console 210 determines that the head orientation is not at the correct orientation. Moreover, because the indicator 296 and the alignment prompt 292 are not aligned it is apparent to the user that his/her head is not at the proper orientation.

Figure 2D:
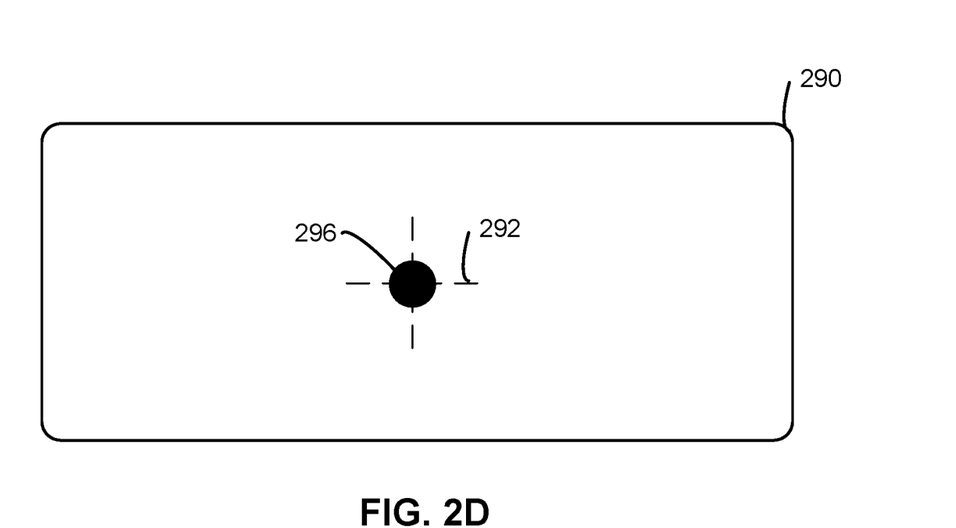
FIG. 2D is a diagram of the display of FIG. 2C in which the user's head is at a correct orientation, in accordance with an embodiment.

FIG. 2D is a diagram of the display of FIG. 2C in which the user's head is at a correct orientation, in accordance with an embodiment. The display 290 on FIG. 2D is substantially similar to the display 290 of FIG. 2C, except the indicator 296 is now displayed on the crosshair 292. Hence, the console 210 can determine the head orientation is properly aligned with the indicator 296.

Figure 3:
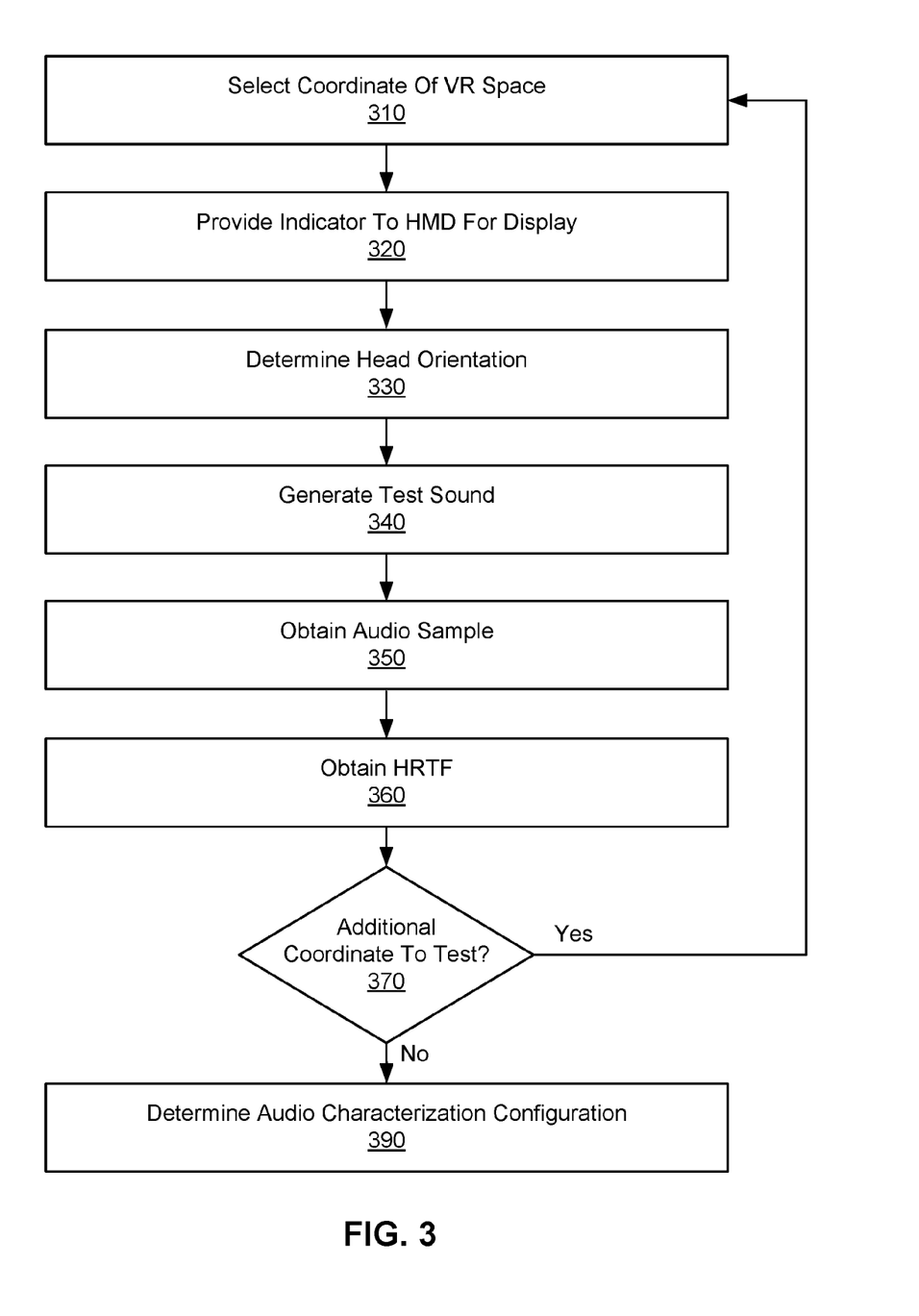
FIG. 3 is a flow chart illustrating a process of obtaining HRTFs, in accordance with an embodiment.

FIG. 3 is a flowchart illustrating a process of obtaining a HRTF, in accordance with one embodiment. In one embodiment, the process of FIG. 3 is performed by the console 210. Other entities may perform some or all of the steps of the process in other embodiments (e.g., the VR headset 105). Likewise, embodiments may include different and/or additional steps, or perform the steps in different orders.

The console 210 selects 310 a coordinate from a set of coordinates of a VR space (e.g., VR space 220) to obtain an audio characterization configuration. The set of coordinates are coordinates of the virtual reality space corresponding to respective HRTFs that are together enough to determine the audio characterization configuration with a sufficient resolution. In one embodiment, the coordinate can be selected randomly from the set of coordinates of the VR space. In one embodiment, the coordinate can be selected in a vertical direction or a horizontal direction in a manner that the least amount of change in the position of the coordinates of the VR space and effectively the change in the head orientation is required.

The console 210 provides 320 an indicator (e.g., the indicator 230) to a HMD (e.g., VR headset 105) for display at the selected coordinate. In one aspect, the HMD displays the alignment prompt and the indicator on the HMD corresponding to the user's head orientation.

The console 210 determines 330 a head orientation. In one example, the console 210 determines the head orientation using an imaging device (e.g., imaging device 135), an IMU associated with the HMD, some other means of locating the HMD in real and/or virtual space, or some combination thereof. In one approach, the console 210 confirms whether the determined head orientation is at a predetermined orientation corresponding to the indicator presented on the HMD. A confirmed head orientation corresponds to the HMD and/or user's head being at a particular orientation relative to a speaker (e.g., speaker 280) for a threshold period of time, the particular orientation corresponds to the head orientation that occurs if the indicator displayed is centered on the alignment prompt. After confirming the head orientation, the console 210 instructs the speaker to generate 340 a test sound.

The console 210 obtains 350 audio samples specific to each ear for the given head orientation through the microphones. The test sound from the speaker is received by microphones (e.g., microphones 185) coupled to each ear of the user, converted into audio samples, and provided to the console 210. The console 210 obtains an HRTF associated with the selected coordinated by performing Fourier transformation on the audio sample.

The console 210 determines 370 whether an audio sample at another coordinate of the VR space 220 should to be obtained. If not all of HRTFs corresponding to the set of coordinates of the VR space 220 are obtained, the console 210 returns to step 310 and selects the next coordinate of the set of coordinates that corresponds to a missing HRTF. Responsive to determining that no additional audio sample at the coordinate should be obtained (i.e., all of the set of coordinates are examined), the console 210 determines 390 the audio characterization configuration based on the HRTFs obtained for the set of coordinates. In one embodiment, the audio characterization configuration can be implemented as a head-related impulse response (HRIR) filter. The filter can be obtained by performing interpolation on a corrected set of HRTFs based on LTF and HTF according to a location of a sound source, and by performing Fourier transformation on the interpolated HRTF to obtain the HRIR filter.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
generating an indicator at a coordinate of a virtual space, the indicator corresponding to a specific orientation of a head-mounted display (HMD) worn by a user relative to an external speaker;
providing the indicator to the HMD, the HMD presenting the indicator at the coordinate of the virtual space;
determining that a first orientation of the HMD relative to the speaker is the specific orientation;
instructing the speaker to provide a test sound while the HMD is at the first orientation;
obtaining an audio sample from a microphone worn by the user, the audio sample being an electronic representation of the test sound received at the microphone; and
determining a head-related transfer function (HRTF) based at least in part on the audio sample.

2. The method of claim 1, wherein determining that the first orientation of the HMD relative to the speaker is the specific orientation, further comprises:
determining that an alignment prompt presented on the HMD is aligned with the indicator for a threshold amount of time, the alignment prompt indicative of the first orientation of the HMD, the indicator indicative of the specific orientation.

3. The method of claim 1, wherein instructing the speaker to provide a test sound while the HMD is at the first orientation, further comprises:
instructing the speaker to generate the test sound, the test sound selected from a group consisting of: a single tone at a selected frequency, and a chirp including multiple tones.

4. The method of claim 1, further comprising:
populating a data set with coordinates in the virtual space that have a specific separation in angle with other coordinates in the data set.

5. The method of claim 4, further comprising:
instructing the speaker to provide a respective test sound while the HMD is at corresponding orientations associated with each of the coordinates in the data set;
obtaining respective audio samples from the microphone at each of the corresponding orientations; and
determining HRTFs for each of the audio samples.

6. The method of claim 5, further comprising:
determining an audio characterization configuration based on the HRTFs, the audio characterization configuration being a function to synthesize a binaural sound that seems to come from a particular point in space.

7. The method of claim 6, further comprising:
synthesizing a binaural sound that seems to come from a particular point in virtual space based on the audio characterization configuration.

8. The method of claim 1, wherein the microphone is placed in an ear canal of the user.

9. A non-transitory computer-readable storage medium storing executable computer program instructions, the instructions executable to perform steps comprising:
generating an indicator at a coordinate of a virtual space, the indicator corresponding to a specific orientation of a head-mounted display (HMD) worn by a user relative to an external speaker;
providing the indicator to the HMD, the HMD presenting the indicator at the coordinate of the virtual space;
determining that a first orientation of the HMD relative to the speaker is the specific orientation;
instructing the speaker to provide a test sound while the HMD is at the first orientation;
obtaining an audio sample from a microphone worn by the user, the audio sample being an electronic representation of the test sound received at the microphone; and
determining a head-related transfer function (HRTF) based at least in part on the audio sample.

10. The computer-readable medium of claim 9, wherein determining that the first orientation of the HMD relative to the speaker is the specific orientation comprises:
  determining that an alignment prompt presented on the HMD is aligned with the indicator for a threshold amount of time, the alignment prompt indicative of the first orientation of the HMD, the indicator indicative of the specific orientation.

11. The computer-readable medium of claim 9, wherein instructing the speaker to provide a test sound while the HMD is at the first orientation comprises:
  instructing the speaker to generate the test sound, the test sound selected from a group consisting of: a single tone at a selected frequency, and a chirp including multiple tones.

12. The computer-readable medium of claim 9, wherein the instructions executable to perform further steps comprising:
  populating a data set with coordinates in the virtual space that have a specific separation in angle with other coordinates in the data set.

13. The computer-readable medium of claim 12, wherein the instructions executable to perform further steps comprising:
  instructing the speaker to provide a respective test sound while the HMD is at corresponding orientations associated with each of the coordinates in the data set;
  obtaining respective audio samples from the microphone at each of the corresponding orientations; and
  determining HRTFs for each of the audio samples.

14. The computer-readable medium of claim 13, wherein the instructions executable to perform further steps comprising:
  determining an audio characterization configuration based on the HRTFs, the audio characterization configuration being a function to synthesize a binaural sound that seems to come from a particular point in space.

15. The computer-readable medium of claim 14, wherein the instructions executable to perform further steps comprising:
  synthesizing a binaural sound that seems to come from a particular point in virtual space based on the audio characterization configuration.

16. The computer-readable medium of claim 9, wherein the microphone is placed in an ear canal of the user.

17. A system comprising:
a processor; and
a non-transitory computer-readable storage medium storing executable computer program instructions, the instructions executable to perform steps comprising:
  generating an indicator at a coordinate of a virtual space, the indicator corresponding to a specific orientation of a head-mounted display (HMD) worn by a user relative to an external speaker,
  providing the indicator to the HMD, the HMD presenting the indicator at the coordinate of the virtual space,
  determining that a first orientation of the HMD relative to the speaker is the specific orientation,
  instructing the speaker to provide a test sound while the HMD is at the first orientation,
  obtaining an audio sample from a microphone located in an ear canal of the user, the audio sample being an electronic representation of the test sound received at the microphone, and
  determining a head-related transfer function (HRTF) based at least in part on the audio sample.

18. The system of claim 17, wherein determining that the first orientation of the HMD relative to the speaker is the specific orientation comprises:
  determining that an alignment prompt presented on the HMD is aligned with the indicator for a threshold amount of time, the alignment prompt indicative of the first orientation of the HMD, the indicator indicative of the specific orientation.

19. The system of claim 17, wherein the instructions executable to perform further steps comprising:
  populating a data set with coordinates in the virtual space that have a specific separation in angle with other coordinates in the data set.

20. The system of claim 19, wherein the instructions executable to perform further steps comprising:
  instructing the speaker to provide a respective test sound while the HMD is at corresponding orientations associated with each of the coordinates in the data set;
  obtaining respective audio samples from the microphone at each of the corresponding orientations; and
  determining HRTFs for each of the audio samples.

* * * * *